United States Patent [19]
Bowen

[11] Patent Number: 5,421,522
[45] Date of Patent: Jun. 6, 1995

[54] NOZZLE ASSEMBLY

[75] Inventor: Strachan D. Bowen, Holland Landing, Canada

[73] Assignee: Bex Engineering Ltd., Mississauga, Canada

[21] Appl. No.: 126,157

[22] Filed: Sep. 24, 1993

[51] Int. Cl.⁶ .................... B05B 1/00; F16L 37/00
[52] U.S. Cl. ................... 239/600; 285/344; 285/360
[58] Field of Search ............... 239/600; 285/344, 360, 285/361

[56] References Cited

U.S. PATENT DOCUMENTS

| | | | |
|---|---|---|---|
| 543,871 | 8/1895 | Houze | 285/344 X |
| 744,646 | 11/1903 | Tietz | 285/211 |
| 943,900 | 12/1909 | Smith | 285/376 |
| 1,033,187 | 7/1912 | Metzger | 285/87 |
| 1,177,884 | 4/1916 | Molesta et al. | 239/523 |
| 1,194,793 | 8/1916 | Styers | 285/376 |
| 1,516,396 | 11/1924 | Mueller et al. | 285/341 |
| 1,589,469 | 6/1926 | Homand | 285/100 |
| 1,890,011 | 12/1932 | Wirz et al. | 285/95 |
| 1,947,593 | 2/1934 | Hamilton | 285/360 X |
| 3,494,639 | 2/1970 | Smith | 285/344 X |
| 3,645,562 | 2/1972 | Fandetti et al. | 285/360 X |
| 3,840,257 | 10/1974 | Moore | 285/334.3 |
| 3,869,156 | 3/1975 | O'Brien et al. | 285/344 X |
| 4,185,781 | 1/1980 | O'Brien | 239/600 |
| 4,349,156 | 9/1982 | Haruch et al. | 239/432 |
| 4,438,884 | 3/1984 | O'Brien et al. | 239/600 |
| 4,527,745 | 7/1985 | Butterfield et al. | 239/600 |
| 4,570,980 | 2/1986 | Goward | 285/305 |
| 4,591,099 | 5/1986 | Emory et al. | 239/419 |
| 4,643,459 | 2/1987 | Carson | 285/360 |
| 4,738,401 | 4/1988 | Filicicchia | 239/600 |
| 4,815,665 | 3/1989 | Haruch | 239/432 |
| 4,828,182 | 5/1989 | Haruch | 239/432 |
| 4,993,756 | 2/1991 | Bechu | 285/319 |
| 5,190,224 | 3/1993 | Hamilton | 239/600 |
| 5,222,773 | 6/1993 | Boehme | 285/344 |

FOREIGN PATENT DOCUMENTS

| | | |
|---|---|---|
| 24732 | 1/1971 | Australia . |
| 1204129 | 5/1986 | Canada . |
| 837543 | 2/1939 | France ................ 285/360 |
| 28930 | of 1910 | United Kingdom . |
| 2901306 | 7/1979 | U.S.S.R. ................ 239/600 |

OTHER PUBLICATIONS

"New ProMax QuickJet Spray Nozzle System" catalogue from Spraying Systems Co.
"Section A—QuickJet Spray Nozzle System" catalogue from Spraying Systems Co.
"Twistloc . . . The Superior Quick Nozzle Assembly System" leaflet from Lechler.

*Primary Examiner*—Andres Kashnikow
*Assistant Examiner*—Lesley D. Morris
*Attorney, Agent, or Firm*—Bereskin & Parr

[57] ABSTRACT

A nozzle assembly has a nozzle body and a nozzle insert. A sealing member for the assembly is mounted in a groove on the nozzle insert, so as to be removed with the insert. The sealing member, for example an O ring, provides both a sealing function and resiliently biases the insert and body into engagement with one another. Locking projections are provided on the body and insert. The insert has a frusto-conical surface on which the O ring is mounted, so that the O ring is both stretched radially and compressed between the body and insert. A second O ring seal can be provided. For ease of manufacture, locking projections on the insert are formed by a pressing operation, and these locking projections can include a short step to facilitate the engagement of the nozzle body and nozzle insert.

34 Claims, 8 Drawing Sheets

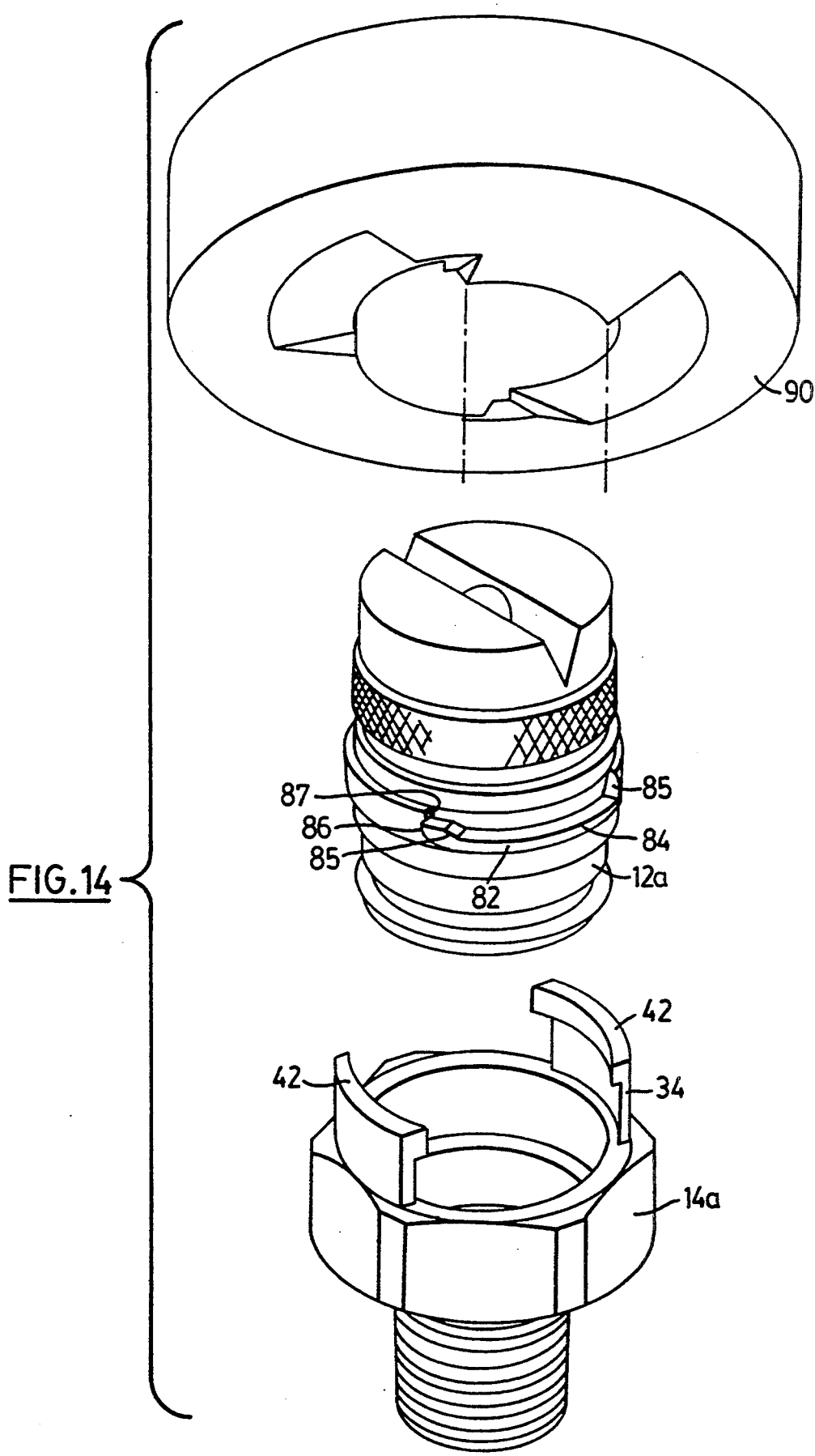

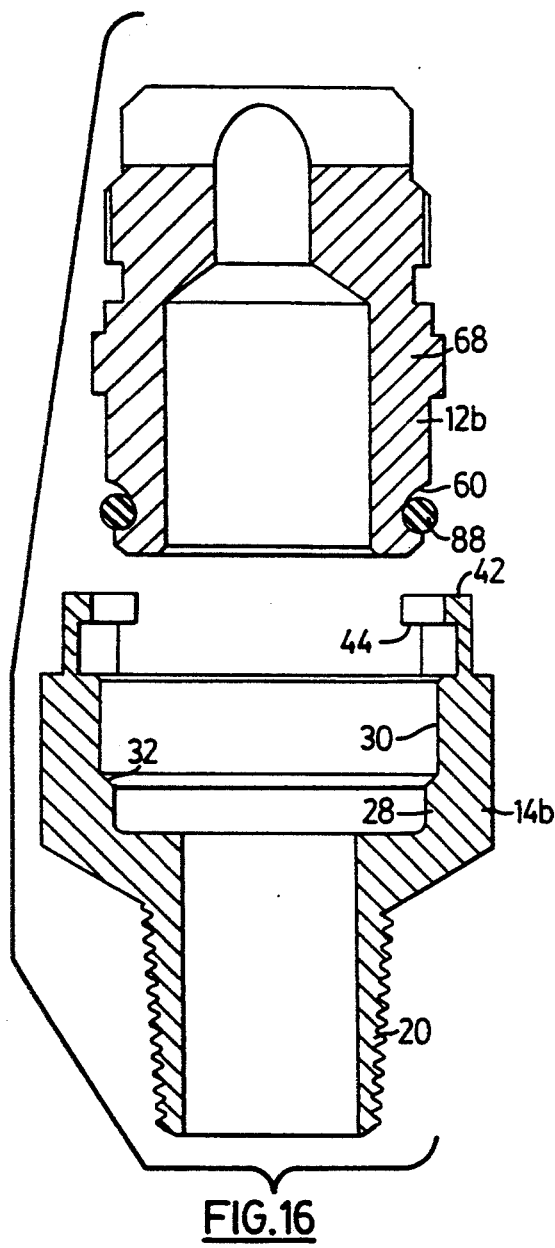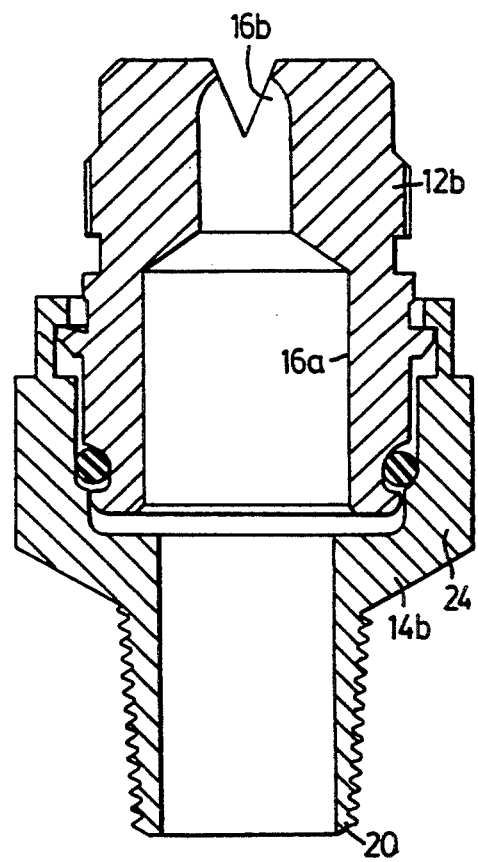
FIG. 16
FIG. 15

NOZZLE ASSEMBLY

FIELD OF THE INVENTION

This invention relates to spray nozzles for fluids, and more particularly is concerned with spray nozzles comprising a nozzle insert or tip capable of being quickly connected and released from a nozzle body.

BACKGROUND OF THE INVENTION

Spray nozzles are used in many areas where a spray of fluid is required, for example: metal washing, foam control, asphalt spraying, vehicle washing, and dishwashing. In some spraying environments it is often desirable to remove spray nozzles frequently for inspection or spray nozzle change. Most standard spray nozzles use a threaded pipe connection for attachment to a fluid source. There are significant limitations to the utility of such spray nozzles in some applications. It is also often desirable to orient a particular spray pattern in a specific direction. In the case where threaded nozzles are used, the nozzles must be realigned each time the nozzles are removed or replaced. It is also apparent that tools must usually be used when installing or removing threaded spray nozzles. This is time consuming and expensive, as is readily apparent to those skilled in the art.

Some quick disconnect spray nozzles have been previously proposed. It is often required that ancillary components be used in the coupling of spray nozzle tip and nozzle body. Such components can be lost or misplaced, and generally result in the requirement for spare components and the consumption of time and cost. Other prior art quick disconnect nozzle assemblies have relied on friction as a means of engagement between spray nozzle tip and nozzle body. Such assemblies require precise manufacturing tolerances, and generally preclude the requirement for positive spray nozzle tip and nozzle body alignment. Some prior art quick disconnect nozzles require significant manual force in order to properly engage the spray nozzle tip and the nozzle body. In some cases the spray nozzle tip can be inserted in the nozzle body and twisted beyond the location at which it is to positively engage and lock with the nozzle body, and the spray nozzle tip must be twisted repeatedly in opposite directions to ensure proper alignment and lock between spray nozzle tip and nozzle body. It is apparent to those skilled in the art that this can cause significant problems when a large number of nozzles are removed and/or replaced by hand.

Some prior art quick disconnect nozzle assemblies are prone to severe sticking between the spray nozzle tip and the spray nozzle body when used in an environment where the nozzle assembly is encrusted by the spray solution, particularly spray solutions containing solids, or other aerosol materials.

Many of the prior art quick disconnect spray nozzle assemblies use special sealing cups and specially molded resilient biasing means. This may present problems when nozzles are to be replaced if these special seals require replacing, and are not available from regular local stock. Commonly, the seals and resilient biasing means are a subcomponent of the spray nozzle body, rather than the spray nozzle tip. It is common to clean out the system with the nozzle tips removed; this can dislodge any seals left in nozzle bodies, requiring them to be retrieved or replaced. In this case, the seal or resilient biasing means must be removed from the body and checked when nozzles are removed or replaced, and reinstalled under the proper conditions. It is apparent to those skilled in the art that this is time consuming and expensive.

Many of the prior art spray nozzle tips and spray nozzle bodies also require significant secondary machining operations in order to achieve a positive locking arrangement and give a precise angular orientation.

It is generally desirable for a quick disconnect nozzle to be capable of easy and simple connection and removal, without requiring tools or any special skills in alignment. Such nozzles can then be replaced by unskilled workers.

SUMMARY OF THE INVENTION

In accordance with the first aspect of the present invention, there is provided a nozzle assembly comprising a nozzle body, having one end adapted for connection to a fluid supply source, a through bore for fluid, and an annular sealing surface and a first locking means; a nozzle insert comprising a nozzle body member, one end of which is adapted for engagement with the nozzle body and the other end of which includes a nozzle outlet, a through passage for fluid extending from the one end to the nozzle outlet, a generally frusto-conical sealing surface, which increases in diameter in a direction towards said other end thereof, and a second locking means complementary to the first locking means; a resilient annular sealing member mountable between the sealing surfaces of the nozzle body and the nozzle insert; and having, in a rest condition, an internal diameter no greater than the smallest diameter of the frusto-conical sealing surface; and wherein the first and second locking means can be engaged to maintain the nozzle insert and the nozzle body in an engaged position, in which the annular sealing member is displaced along the frusto-conical sealing surface and expanded radially, and is compressed between the sealing surfaces, whereby the sealing member both maintains a seal between the nozzle body and the nozzle insert and resiliently biases the first and second locking means into engagement with one another. The nozzle body has an inlet section extending from one end of the nozzle body, and a middle section defining first and second cylindrical chambers, the first cylindrical chamber being located between the inlet section and the second cylindrical chamber, with the sealing surface of the nozzle body being provided between the first and second cylindrical chambers and with the second cylindrical chamber having a larger diameter than the first cylindrical chamber. Additionally, the diameter of the second cylindrical chamber is sufficiently greater than the diameter of the first groove of the nozzle insert, that the nozzle insert can be inserted into the nozzle body until the sealing member contacts the sealing surface of the nozzle body, without the sealing member binding on the second cylindrical chamber.

Preferably, the sealing member comprises an O ring, and the nozzle insert includes a first groove including the frusto-conical surface as the bottom surface of the groove. The O ring is then located in the first groove.

More preferably, the nozzle body sealing surface is also frusto-conical, and the frusto-conical bottom surface of the first groove in the nozzle insert is defined by rounded shoulders.

By providing the O ring or other sealing member on the nozzle insert, the sealing member is removed with the insert. In use, the nozzle body would be secured, e.g. by means of an integral screw thread, into a socket of a fluid supply system or source.

In such a system, it is common to remove the nozzles, for cleaning or servicing, and then to flush out the system with the nozzles removed. Where seals are present in the nozzle body, this can result in the seals being displaced. As a result, the seals are either lost, or have to be replaced; in either event, it is necessary for an operator to check each nozzle body carefully, to ensure that the seal has not been lost.

By providing the sealing member on the nozzle insert, this danger is overcome. Further, it necessarily ensures that, when a nozzle insert is replaced, the seal is also replaced. Since the seal is a relatively inexpensive part of the assembly, but is crucial for the sealing function, it is desirable to replace the seals regularly.

By providing a frusto-conical bottom surface on the first groove, which in section preferably has an angle of approximately 30° to the axis, the O ring, during engagement is displaced or rolled up this bottom surface. The O ring is consequently stretched radially. Simultaneously, the O ring is compressed between this bottom surface and the sealing surface of the nozzle body, which preferably is at an angle of approximately 45° to the axis. The O ring is thus compressed through its cross-section.

Advantageously, the nozzle insert includes a second groove for a second O ring, located between the first O ring and the outlet end of the nozzle insert. This can be used to ensure that fluid cannot enter between the nozzle body and insert, between the two O rings. This is particularly useful in environments where the fluid being sprayed included solids or other material which can form solid precipitates between the nozzle body and insert, preventing ready removal of the nozzle insert.

For this purpose, it is preferred for the second O ring and the second groove to be sized so as to be a sliding fit in a cylindrical portion of a nozzle body, while forming a seal therewith.

The nozzle insert could be formed from any suitable material, and is preferably formed largely by a conventional turning operation. To facilitate formation of the locking projections, and to avoid numerous separate milling or machining steps, these are preferably formed by a pressing operation.

To this end, the nozzle insert is provided with an annular extension or other annular portion. A press tool is generally circular and has a through bore dimensioned for a sliding fit over the annular extension. It has an end face including forming portions and cut away portions, set back axially therefrom. The forming portions are shaped to provide the desired profile to the locking projections. For other nozzle configurations, a different shape of press tool could be used. In particular, the press tool could be in two parts, each of which could approach the nozzle insert both axially and radially inwardly; this can accommodate nozzles with the outlet end larger than the end engaging the nozzle body.

Most preferably, the press tool initially has a generally conical end surface, so as to form engagement surfaces having a corresponding conical engagement face. Further, the forming portions preferably form short steps which are intermediate, in the axial direction, between the forming portions and the cut away portions.

Then, the forming tool can simply be pressed axially down against the annular extension, to form the locking projections.

Accordingly, in accordance with a further aspect of the present invention, there is provided a method of forming a nozzle insert from a nozzle body member comprising the steps of:
 (a) forming a passage through the nozzle body member from one end to the other, for fluids;
 (b) forming a first groove adjacent to the one end of the nozzle body member, for receiving an annular sealing member;
 (c) forming an annular extension on the nozzle body member between the first groove and the other end of the nozzle body member;
 (d) by means of a pressing operation with a pressing tool displaced axially relative to the nozzle body member, forming radially extending locking projections in the annular extension.

There is also provided a press tool, the press tool comprising a generally annular body having a conical end face; and generally diametrically opposed cut away portions in the end face, leaving diametrically opposed forming portions.

Another aspect of the present invention provides a nozzle insert, for use with a nozzle body including a first locking means and an annular sealing surface, the nozzle insert comprising: a nozzle body member; a passage extending through the nozzle body member from one end to the other end thereof, which other end has a nozzle outlet; a first groove, adjacent the one end of the nozzle body member, for receiving an annular sealing member, and including a frusto-conical bottom surface which increases in diameter in a direction towards said other end; an annular sealing member located in the first groove, and having an inner diameter, in a rest position, smaller than the diameter of the first groove; and second locking means complementary with the first locking means of a nozzle body for engagement therewith, whereby, in use, the nozzle insert can be engaged in the nozzle body, with the first and second locking formations retaining the nozzle insert, and with the sealing member being displaced along the frusto-conical bottom surface and compressed between the first groove and the annular sealing surface, whereby the sealing member both biases the first and second locking means into engagement with one another and forms a seal between the nozzle insert and the nozzle body. Additionally, a second annular groove is located between the first groove and the other end of the nozzle insert, and a second sealing member is located in the second groove, for forming a seal with the nozzle body to prevent fluid penetrating between the nozzle body and the nozzle insert, between the annular sealing members. The second groove has a larger diameter than the first groove and the second annular sealing member has a rest diameter smaller than the diameter of the second groove.

BRIEF DESCRIPTION OF THE DRAWINGS

For a better understanding of the present invention and to show more clearly how the same may be carried into effect, reference will now be made, by way of example, to the accompanying drawings which show preferred embodiments of the present invention, and in which:

FIG. 14 is a perspective, exploded view showing the pressing tool, nozzle insert and nozzle body of the first embodiment; and FIGS. 15 and 16 are sectional views, similar to FIGS. 6 and 7, showing a second embodiment of the nozzle insert.

BRIEF DESCRIPTION OF PREFERRED EMBODIMENT

Figure 1:
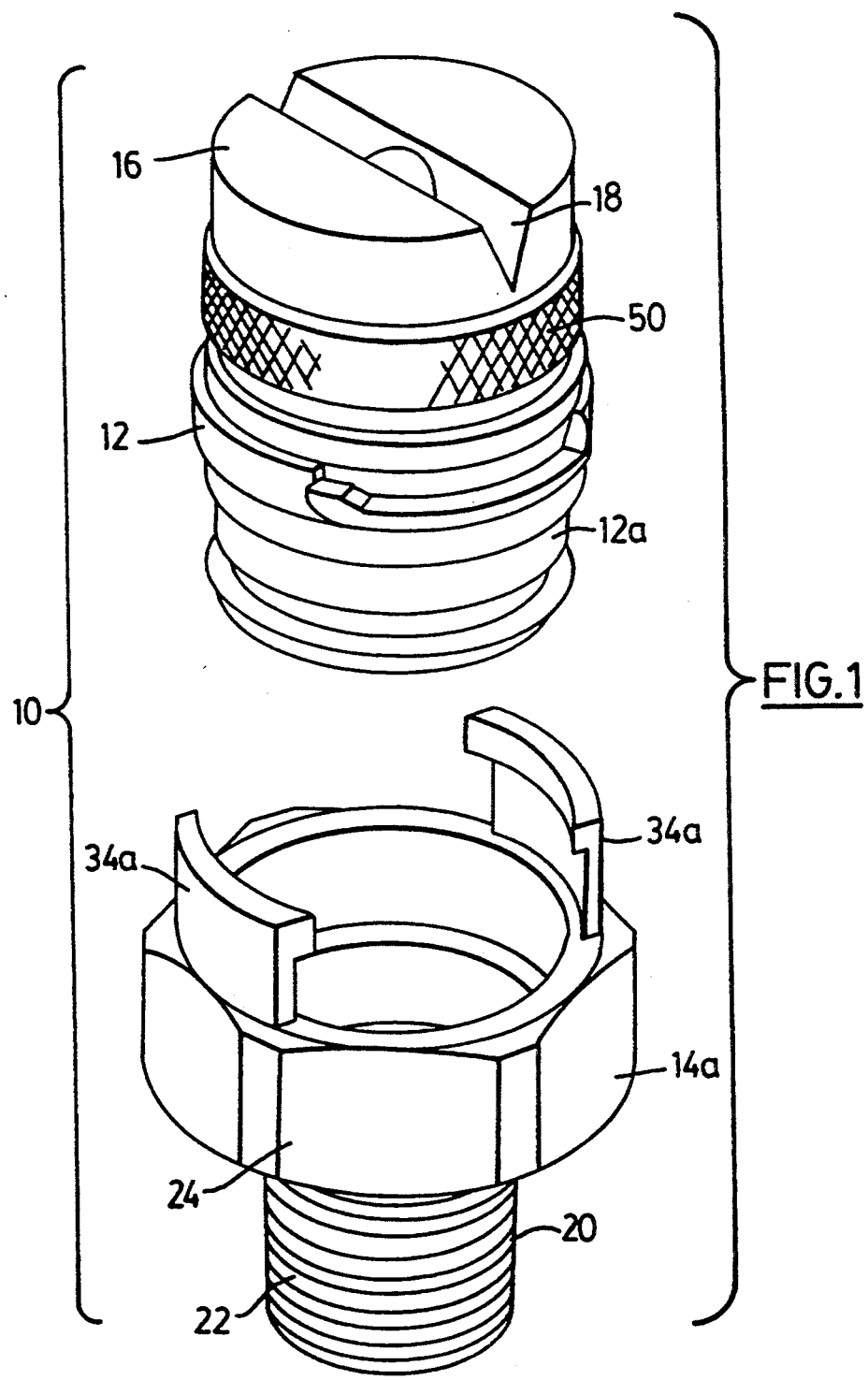
FIG. 1 is a perspective view of a first embodiment of a nozzle body and nozzle insert of a nozzle assembly, shown separated.
Figure 2:
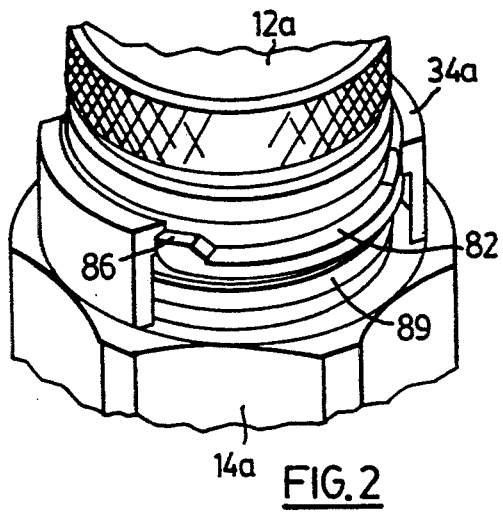
FIGS. 2, 3 and 4 are part perspective views of the nozzle of the assembly of FIG. 1, showing insertion of the nozzle insert.

Reference is first made to FIGS. 1 and 2 of the drawings, which show a perspective view of a first embodiment of a quick disconnect nozzle assembly 10. The nozzle assembly 10 has a spray nozzle tip or insert 12 and a nozzle body 14. The tip 12 and body 14 are formed of a suitable material, such as stainless steel or brass, or a suitable plastic, such as nylon or glass-filled polypropylene. The nozzle tip 12 has a through passage 16 for a liquid attached to an inlet end of the nozzle body 14. Typically, the nozzle insert will be formed at one end (the lower end in FIGS. 6 and 7) with the passage 16 having a portion 16a of larger diameter, which can be constant for a number of different nozzle configurations. At its other end, as indicated at 16b, the passage would be formed to have different diameter for different nozzle types. In its end face, the nozzle tip 12 has a groove 18 formed, in this exemplary embodiment of the nozzle tip, to produce a particular spray pattern.

It is to be appreciated that the exact configuration of the nozzle forms no part of the present invention, and the present invention is applicable to any desired nozzle formation at the free end of the nozzle tip 12 which provides a fluid connection, e.g. a threaded connection, for connection to any fluid device. For example, the body 14 could comprise a nozzle ball which is rotatably mounted and into which the insert 12 is mounted.

The nozzle body 14 has an inlet end section 20, provided in known matter with a tapered screw thread 22. A central-section 24 of the nozzle body 14 has a hexagonal profile, for application of wrench in known manner. Also, in known manner, the threaded end section 20 would be engaged in a corresponding threaded bore of a socket, of a fluid supply system.

Figure 6:
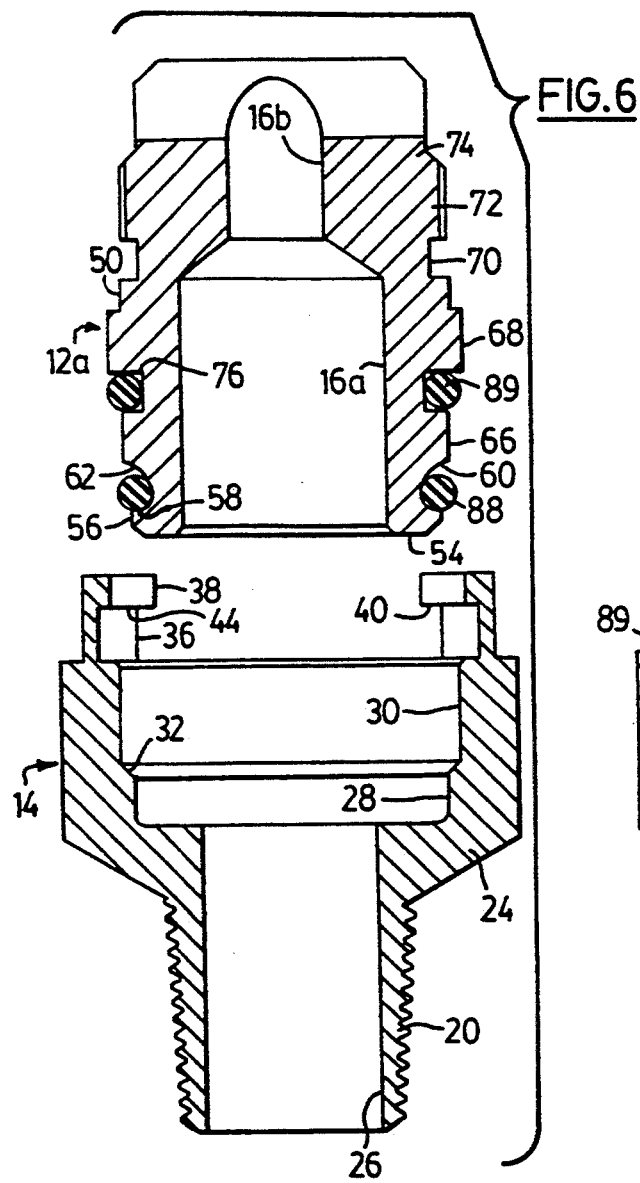
FIG. 6 is a section along the axis of the nozzle assembly with the nozzle body and the nozzle insert shown separated.
Figure 7:
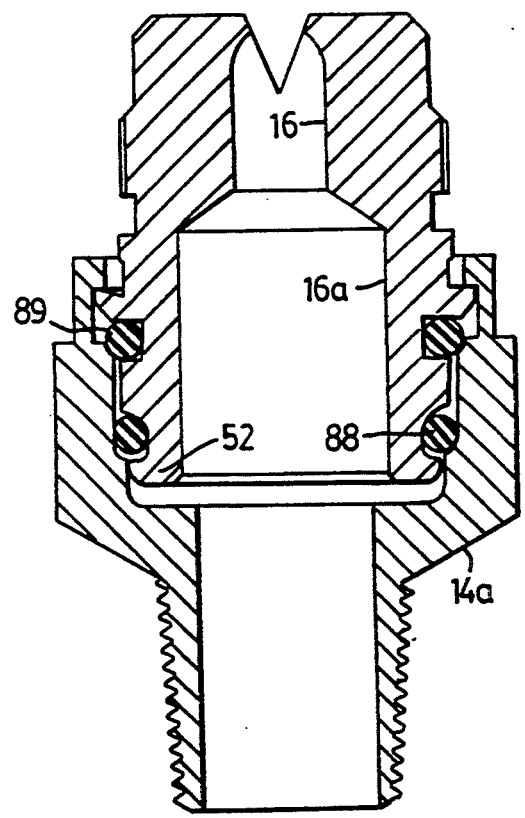
FIG. 7 is a sectional view similar to FIG. 6 showing the nozzle assembly when fully assembled.

Referring to FIGS. 6 and 7, the inlet end section 20, at one end includes an inlet bore 26, for supply of liquid, which opens into a first cylindrical chamber 28 in the central-section 24. Continuous with this chamber 28 is a second cylindrical chamber 30 of larger diameter. A frusto-conical sealing surface 32 extends between the walls of the chambers 28, 30, and is inclined at an angle of approximately 45° to the axis of the body 14 i.e. the surface 32 has a generating angle of 45°. This angle of inclination being chosen to facilitate proper seating of an annular sealing member on the nozzle tip 12, as detailed below.

Extending from the central-section 24, there are a pair of diametrically opposed legs 34. Initially, the legs 34 are formed as a continuous extension of the central-section 24. Within this extension, there are two cylindrical portions 36 and 38, with the portion 38 being a smaller diameter, so as to define an annular ledge 40 between them.

A final machining step, during manufacture, removes portions of the extension, to leave the two legs 34a. FIG. 1 shows one embodiment, in which two separate machining or milling steps on the body 14 remove two oppositive parts of this extension, to leave two legs 34a opposite one another.

Alternatively, in a second embodiment, the two opposite sides of the extension can be removed, by a single machining operation crossing the axis of the insert 14, as shown in FIG. 8, again to leave two legs, denoted 34b. As detailed below, the insert 12 would have locking projections corresponding to the legs 34a, or 34b as required. Correspondingly, the first and second embodiments of the nozzle body are distinguished by the references 14a, 14b respectively.

For both embodiments, a portion or all of the legs 34a, 34b are part of section that has had all or part of the hexagonal section removed to leave a cylindrical outlet profile. This prevents a user attempting to engage the legs with a wrench; as the legs are not continuous circumferentially, they can be easily damaged by a wrench or the like.

The difference is that in the second embodiment, the legs 34b have vertical faces that face one another, while in the first embodiment, the legs 34a have vertical faces that are continuous in two common, parallel planes.

In either embodiment, each leg 34 has an inwardly extending arcuate section 42, forming a locking projection, with a portion of the annular ledge 40 forming a locking or engagement face 44, for engagement with the nozzle insert 12, as detailed below. During the final machining operation, forming the legs, it is sufficient if this removes two opposite portions of the cylindrical portion 38; thus the legs 34 could be shorter than those shown.

Figure 8:
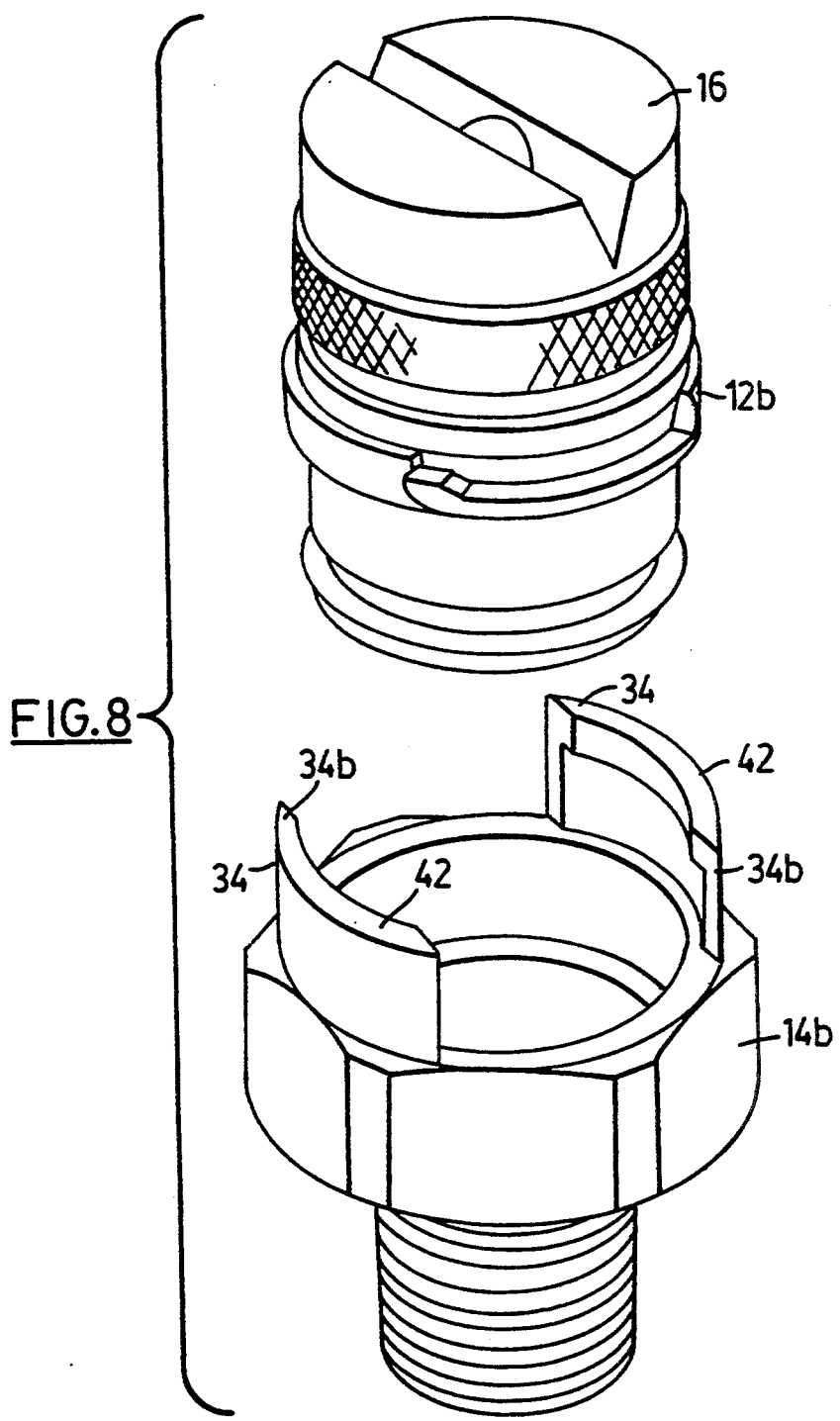
FIG. 8 is a perspective view, similar to FIG. 1, of a second embodiment of the invention.
Figure 9:
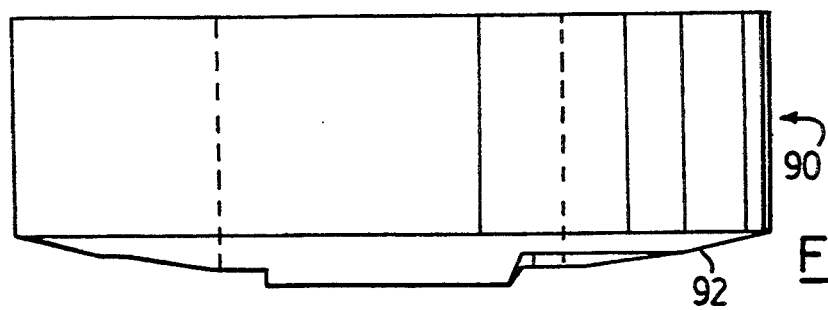
FIG. 9 is a side view of a press tool for forming locking projections on the nozzle insert.

Turning to the nozzle insert 12, two embodiments of the nozzle tip 12 are provided, a first embodiment 12a as shown in FIGS. 1 to 7, and a second embodiment 12b as shown in FIGS. 8, 15 and 16. The first embodiment 12a is described first.

The nozzle insert 12a is largely cylindrical, and would be formed by a turning operation in known manner. A through passage 16 extends from one end to the other end, which has a nozzle outlet. The nozzle insert 12a has a nozzle body member 50, and extending from its one end 52, the through passage 16 has a portion 16a of larger diameter. Nozzle body member 50 has an annular end surface 54 provided with 45° internal and external bevels, with the external bevels having a greater radial extent.

Figure 5:
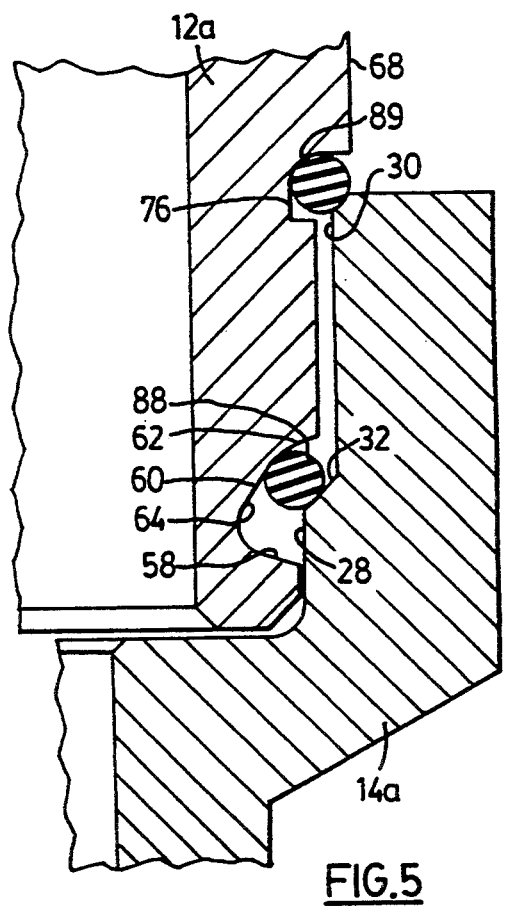
FIG. 5 is an enlarged view in a plane including the axis, showing the configuration of the sealing member in the engaged position.

Adjacent the end surface 54 is a short cylindrical portion 56, defining a shoulder 58 at one side of an annular groove 60 for a first O ring. The other side of the annular groove 60 is defined by a second shoulder 62. As shown in the detail of FIG. 5, the groove 60 has a frusto-conical bottom surface 64, which increases in diameter in a direction away from the other end 52. As shown, the ends of the surface 64 are circular in section so as to continue smoothly into the shoulders 58, 62. The surface, in section, has an angle of approximately 30° to the axis i.e. the surface 64 has a generating angle of 30°.

The second shoulder 62 is formed at the end of an intermediate section 66 of larger diameter. Towards one end of the section 66, there is an annular extension 68, of larger diameter. Radially extending locking projections are formed in this, as detailed below.

Adjacent the intermediate section 66, and separated by an annular channel 70 is a gripping portion 72. This gripping portion is cylindrical and of slightly smaller diameter than the intermediate section 66; in other nozzle configurations it could be larger, and as detailed below, this would require a different technique to form the locking projections. As shown, it is provided with a knurled finish to facilitate gripping. The other end of the nozzle insert 12a has a smaller diameter as shown at 74 and is connected to the knurled portion 72 by a frusto-conical section.

As shown in FIGS. 6 and 7, this first embodiment has a second annular groove 76, of larger diameter than the first annular groove 60 adjacent the extension 68. This is intended to accommodate a second O ring, as detailed below. It has an axial length slightly greater than the thickness of the O ring.

As shown in FIGS. 15 and 16, the second embodiment omits the second annular groove 76, but is otherwise identical to the first embodiment. In FIGS. 15 and 16, the nozzle insert is denoted by the reference 12b, to distinguish it from the first embodiment, with like parts being given the same reference numeral for simplicity. The first embodiment is distinguished by the reference 12a, where necessary.

Figure 10:
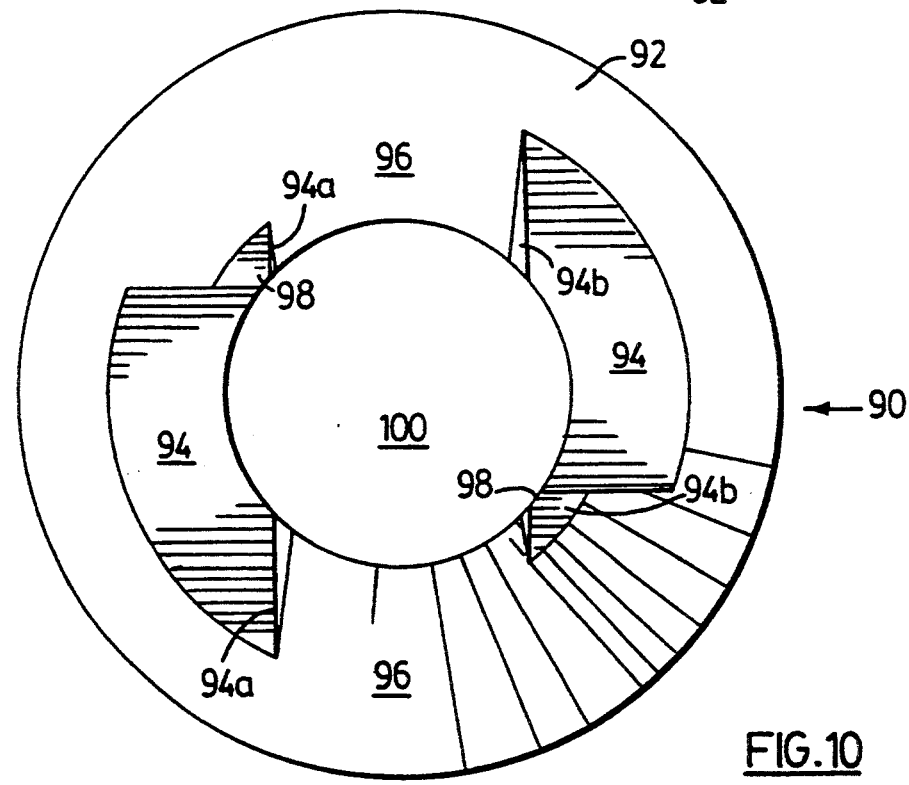
FIG. 10 is an axial view, from underneath, of the press tool of FIG. 9.
Figure 11:
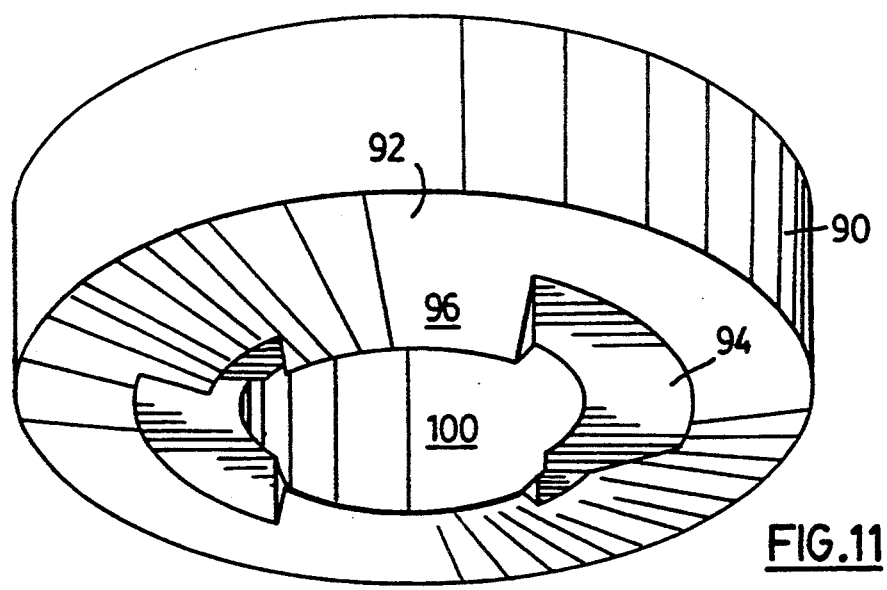
FIG. 11 is a perspective view of the press tool of FIGS. 9 and 10.

Turning to the locking projections formed on the annular extension 68, these are formed by means of a press tool shown at 90 in FIG. 9–14. The press tool 90 is generally cylindrical with a conical end face 92, which has a relatively large included angle, so that this face extends at only a small angle to a plane perpendicular to its axis. The press tool 90 has an internal bore 100, whose diameter is slightly larger than that of the intermediate section 66, so as to be a free sliding fit over the knurled portion 72 and also the intermediate section 66. At either side, the face 92 has two cut away portions 94, where no locking projections are formed. The two remaining conical forming portions, adjacent the bore 100, each indicated at 96 are intended to form the locking projections. As shown at each end, a small piece is cut away to provide a short step at 98. The cut away portions 94 are removed along lines 94a, 94b, each of which represents a chord, extending as shown. Also, as shown in FIG. 10, the end faces of the forming portions 96 are inclined, so that the circumferential extent of each portion 96 increases towards the end face 92.

The tool 90 shown is suitable for forming locking projections corresponding exactly to the legs 34a and suitable for legs 34b. To exactly align with legs 34b, the lines 94a, 94b, in theory, would need to be replaced by a pair of opposite, parallel lines, each associated with one forming portion 96. While the lines 94a, 94b do not form end faces corresponding exactly to the ends of legs 34b, the legs 34b can be dimensioned so as to form a secure fit with locking projections formed by the tool 90.

Figure 12:
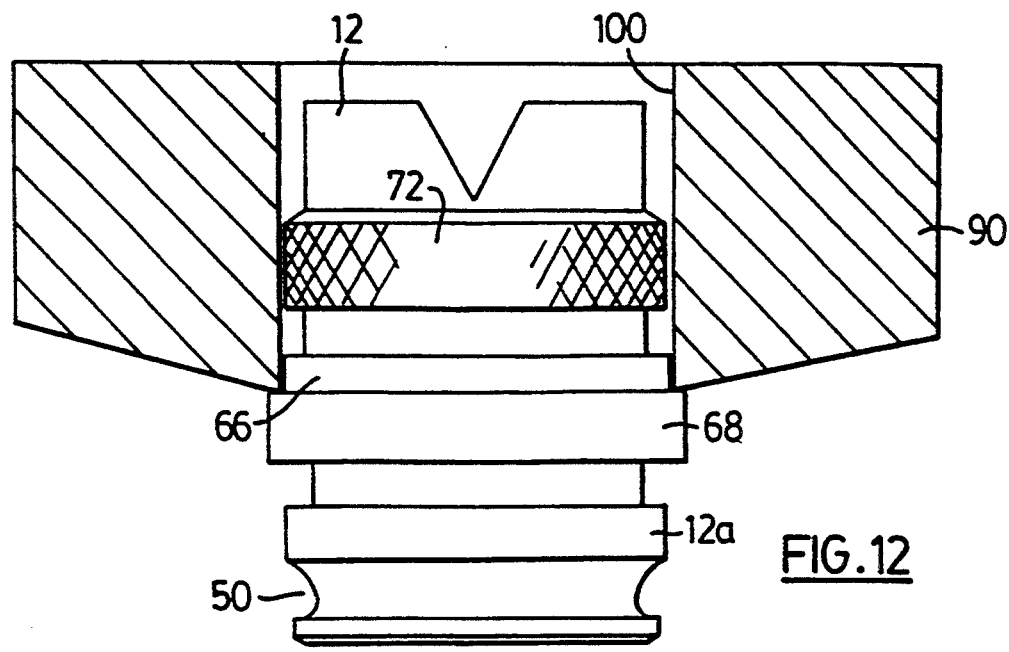
FIGS. 12 and 13 are sectional views, including the axis, showing the press tool and the nozzle insert, and formation of the locking projections.
Figure 13:
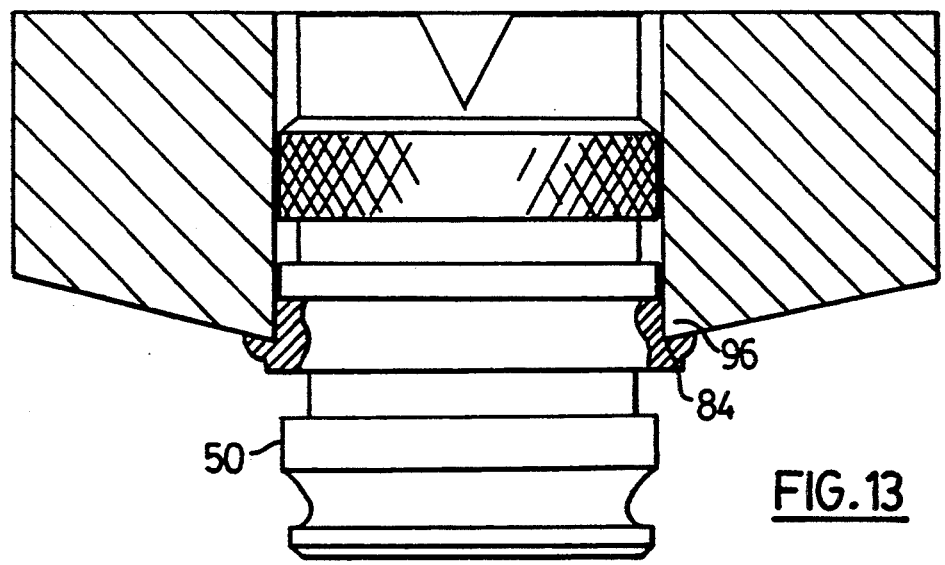

To form the locking projections, the press tool 90 is placed over the spray nozzle tip 12, as shown in FIGS. 12 and 13, and pressed down until the cut away portions 94 come approximately into abutment with the end of the annular extension 68 facing towards the knurled portion 72. By then, the forming portions 96 have been pressed into the annular extension 68 axially, causing it to deform radially, to form two locking projections 82, each of which has an engagement face 84, complementary to the forming portions 96. This is best shown in FIG. 14. Each engagement face 84 has a short step 86.

The inclined end faces to the forming portions 96 form corresponding inclined end faces 85 at the end of the engagement faces 84. The short step 86 has a vertical or perpendicular surface 87 at one end.

The tool 90 is suitable when the outlet end of the insert 12 is smaller than the annular extension 68. As noted above, there are nozzle configurations, where it is necessary to provide a large outlet end, with the outlet, and possibly the knurled and gripping portion, larger than the annular extension 68. For such nozzles, an annular press tool 90 cannot be used. Instead, two separate press tools would be used for forming each individual locking projection 82. The press tools will then be displaced towards the insert 12, both axially and radially. For example, the press tool could be displaced radially at the intermediate section 66, above the annular extension 68, and then it can be displaced axially, so as to form the locking projection.

In use, the first embodiment of the nozzle tip 12a is provided with a pair of O rings 88, 89, as shown in FIGS. 1–7. To mount the nozzle tip 12a in the body 14, it is simply slidingly engaged, as shown in FIG. 2, with the locking projections 82 passing between the legs 34a.

The slope of the first annular groove 60 will maintain the first O ring 88 against the first shoulder 58, the O ring being sized to be slightly smaller in diameter than the diameter adjacent to the first shoulder 58. The O ring will then have an external diameter slightly less than the internal diameter of the second cylindrical chamber 30 and can pass freely through it.

The second O ring 89 is similar to the first O ring, and again is stretched slightly for engagement in the second annular groove 76. Here, it has a slightly larger diameter than the first O ring 88, and is only slightly larger than the second cylindrical chamber 30.

Now, the axial length between the locking projections 82 and the first O ring 88 is slightly greater than the axial extent between the engagement faces 44 and the seal engaging surface 32, so that the first O ring 88 comes into abutment with the seal engaging surface 32, before the engagement faces 84 pass the engagement faces 44.

Figure 3:
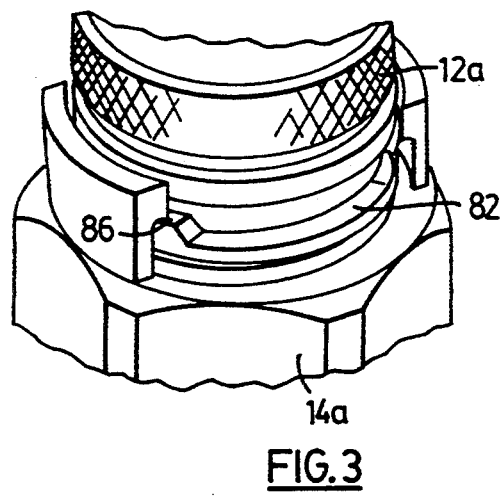
Figure 4:
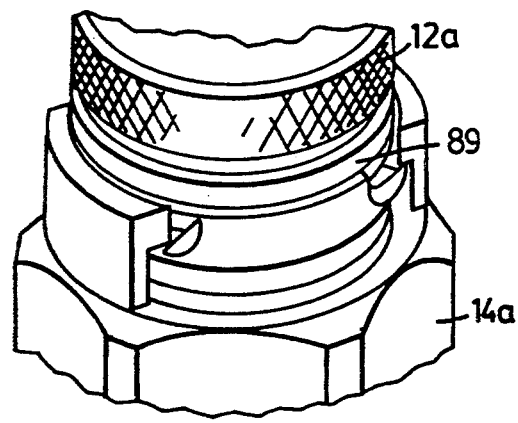

The nozzle tip 12 is then pressed further into the body 14 against the resilient action of the first O ring 88. The first O ring 88 is displaced by the seal engaging surface 32 up the frusto-conical bottom surface 64 of its groove 60. This simultaneously stretches the first O ring 88 radially, while causing the O ring to be compressed through its cross section. At the point of maximum insertion, the O ring 88 is sandwiched between the shoulder 62 and the seal engaging surface 32. The double action of radial expansion and compression through its thickness enables the O ring 88 to provide both a strong resilient biasing action and a sealing action. The spray nozzle tip 12 is pressed in far enough to enable it to be rotated clockwise so that the engagement faces 44 contact the short steps 86 (FIG. 3). The clockwise rotation is continued until the engagement faces 44 disengage from the short steps 86 and engage solely the engagement faces 84. This permits the O ring 88 to displace the nozzle tip 12 axially outward to a small extent. The engagement faces 44, 84 have approximately the same circumferential extent, so that the locking tip is then held securely in position behind the end faces 85.

In this configuration, the second O ring 89 then is located immediately at the open end of the second cylindrical chamber 30 (FIG. 5).

Where the second embodiment of the spray nozzle tip 12b is employed, the second O ring 89 is omitted. This version functions otherwise identically to the nozzle tip 12a. It is most suitable for environments where there is expected to be no difficultly in build up of solids or other material, which could interfere with removal and replacement of the nozzle tip or insert.

The various relevant dimensions relating to the interlocking features of the nozzle insert body are identical for the first and second embodiments. Thus, either one of the nozzle inserts 12a or 12b could be used with either one of the nozzle bodies 14a, 14b. As noted above in relation to the press tool 90, while the body 14b will not correspond exactly to the legs 34a, 34b, it can still be dimensioned to provide secure engagement.

To remove the insert, the procedure is reversed. The insert 12 is pressed into the body 14, against the resilient action of the O ring 88 and rotated until the steps 86 engage the engagement faces 44. The axial pressure can then be released, and the insert 12 rotated until it disengages from the legs 34.

It is to be noted that the conical face 92 of the press tool results in the engagement surfaces 84 being part of a conical surface. In section, as shown in FIG. 7 and elsewhere, these faces 84 incline upwards in a radially outwards direction. A further reason for this is to ensure effective displacement of material to form the locking projections.

I claim:

1. A nozzle assembly comprising:
   a nozzle body comprising one end adapted for connection to a fluid supply source, a through bore for fluid, an annular sealing surface, a first locking means, an inlet section, extending from the one end of the nozzle body, and a middle section defining first and second cylindrical chambers, the first cylindrical chamber being located between the inlet section and the second cylindrical chamber, wherein the sealing surface of the nozzle body is provided between the first and second cylindrical chambers, the second cylindrical chamber having a larger diameter than the first cylindrical chamber;
   a nozzle insert comprising a nozzle body member, one end of which is adapted for engagement with the nozzle body and the other end of which includes a nozzle outlet, a through passage for fluid extending from the one end to the nozzle outlet, a first annular groove including a generally frusto-conical annular sealing surface as a bottom surface of the groove, which sealing surface is located around the through passage and, increases in diameter in a direction towards said other end thereof, and a second locking means complementary to the first locking means;
   a first resilient annular sealing member mountable in the first groove, and having, in a rest condition, an internal diameter no greater than the smallest diameter of the frusto-conical sealing surface, wherein the diameter of the second cylindrical chamber is sufficiently greater than the diameter of the first groove of the nozzle insert that the nozzle insert can be inserted into the nozzle body until the sealing member contacts the sealing surface of the nozzle body, without the sealing member binding on the second cylindrical chamber; and
   wherein the first and second locking means can be engaged to maintain the nozzle insert and the nozzle body in an engaged position, in which the annular sealing member is displaced along the frusto-conical sealing surface and expanded radially, and is compressed between the sealing surfaces, whereby the sealing member both maintains a seal between the nozzle body and the nozzle insert and resiliently biases the first and second locking means into engagement with one another.

2. A nozzle assembly as claimed in claim 1, wherein the sealing member comprises an O ring.

3. A nozzle assembly as claimed in claim 2, wherein the sealing surface of the nozzle body is generally frusto-conical, and increases in diameter in a direction away from the one end of nozzle body.

4. A nozzle assembly as claimed in claim 3, wherein the frusto-conical bottom surface of the first groove is defined by rounded shoulders which are substantially continuous therewith.

5. A nozzle assembly as claimed in claim 4, wherein the nozzle body includes at the other end thereof, extending from the middle section thereof, a pair of legs which are diametrically opposed to one another and wherein the first locking means comprises a pair of first locking projections on the legs extending radially inwards and defining first engagement faces.

6. A nozzle assembly as claimed in claim 5, wherein the internal profile of each leg is generally circular and centered on the axis of the nozzle body, and each of the first engagement faces has a part-annular shape.

7. A nozzle assembly as claimed in claim 6, wherein the nozzle insert has a generally circular cross-section throughout, and wherein the second locking means comprises a pair of locking projections extending radially outwards, each providing a part-annular second engagement face for abutting a first engagement face.

8. A nozzle assembly as claimed in claim 7, wherein the second engagement faces are, in section, inclined at an angle to the axis, so as to have a part frusto-conical shape.

9. A nozzle assembly as claimed in claim 8, wherein the second locking projections are formed on an intermediate section of the nozzle insert, which intermediate section is generally annular.

10. A nozzle assembly as claimed in claim 9, wherein the nozzle insert includes a second annular groove, located between the first annular groove and the other end of the nozzle insert, and wherein a second O ring is located in the second groove, and in use abuts the nozzle body to prevent fluid entering the nozzle body, between the first and second O rings.

11. A nozzle assembly as claimed in claim 10, wherein the second groove has a diameter slightly greater than the rest diameter of the second O ring, whereby the second O ring is securely retained in the second groove, wherein the external diameter of the second O ring and the second groove are such that the second O ring forms a sliding fit within the second cylindrical chamber of the nozzle body, while forming a seal therewith.

12. A nozzle assembly as claimed in claim 11, wherein the second groove is located on the nozzle insert such that, with the nozzle insert engaged in the nozzle body, the second O ring is located at an end of the second cylindrical chamber adjacent to the legs.

13. A nozzle insert, for use with a nozzle body including a first locking means and an annular sealing surface, the nozzle insert comprising:
 a nozzle body member;
 a passage extending through the nozzle body member from one end to the other end thereof, which other end has a nozzle outlet;
 a first groove, adjacent the one end of the nozzle body member, for receiving an annular sealing member, and including a frusto-conical bottom surface which extends around the passage and increases in diameter in a direction towards said other end;
 a first annular sealing member located in the first groove, and having an internal diameter, in a rest position, smaller than the smallest diameter of the first groove;
 a second annular groove located between the first groove and the other end of the nozzle insert, and a second sealing member located in the second groove, for forming a seal with the nozzle body to prevent fluid penetrating between the nozzle body and the nozzle insert, between the annular sealing members, wherein the second groove has a larger diameter than the first groove and the second annular sealing member has a rest diameter smaller than the diameter of the second groove; and
 second locking means complementary with the first locking means of a nozzle body for engagement therewith, whereby, in use, the nozzle insert can be engaged in the nozzle body, with the first and second locking means retaining the nozzle insert, and with the first sealing member being displaced along the frusto-conical bottom surface and compressed between the first groove and the annular sealing surface, whereby the sealing member both biases the first and second locking means into engagement with one another and forms a seal between the nozzle insert and the nozzle body, and with the second sealing member forming a seal so as to prevent fluid entering between the first and second sealing members.

14. A nozzle insert as claimed in claim 13, wherein each of the annular sealing members comprises an O ring.

15. A nozzle insert as claimed in claim 14, wherein the first groove is provided with rounded shoulders substantially continuous with the frusto-conical bottom surface.

16. A nozzle insert as claimed in claim 13, 14, or 15, wherein the second locking means comprises part-annular locking projections extending radially outwardly.

17. A nozzle insert as claimed in claim 16, wherein the locking projections define second engagement faces comprising a main engagement portion and a short step portion displaced axially towards the other end of the nozzle insert.

18. A nozzle assembly comprising:
 a nozzle body comprising one end adapted for connection to a fluid supply source, a through bore for fluid, an annular sealing surface and a first locking means;
 a nozzle insert comprising a nozzle body member, one end of which is adapted for engagement with the nozzle body and the other end of which includes a nozzle outlet, a through passage for fluid extending from the one end to the nozzle outlet, a first annular groove including a generally frusto-conical annular sealing surface, as a bottom surface of the first groove, which sealing surface is located around the through passage and increases in diameter in a direction towards said other end thereof, a second annular groove, located between the first annular groove and the other end of the nozzle insert, and a second locking means complementary to the first locking means;
 a first resilient annular sealing member mounted in the first groove;
 a second resilient sealing member mounted in the second groove; and
 wherein the first and second locking means can be engaged to maintain the nozzle insert and the nozzle body in an engaged position, in which the first annular sealing member is displaced along the frusto-conical sealing surface and expanded radially, and is compressed between the sealing surfaces, whereby the first annular sealing member both maintains a seal between the nozzle body and the nozzle insert and resiliently biases the first and second locking means into engagement with one another, and in which the second sealing member abuts the nozzle body, to prevent fluid entering the nozzle body between the first and second annular sealing members.

19. A nozzle assembly as claimed in claim 18, wherein the sealing surface of the nozzle body is generally frusto-conical, and increases in diameter in a direction away from the one end of the nozzle body.

20. A nozzle assembly as claimed in claim 19, wherein each of the first and second annular sealing members comprises an O ring, and wherein the rest diameter of the first and second sealing members is less than the diameter of the first and second grooves respectively.

21. A nozzle assembly as claimed in claim 20, wherein the nozzle body includes at the other end thereof, a pair of legs which are diametrically opposed to one another, and which have a generally circular profile centered on the axis of the nozzle body, wherein the first locking means comprise a pair of locking projections extending radially inwards and defining part-annular first engagement faces, and wherein the second locking means comprise a pair of locking projections extending radially outwards from the nozzle insert and each providing a part-annular second engagement face for abutting a first engagement face.

22. A nozzle assembly as claimed in claim 20 or 21, wherein the external diameter of the second O ring and the second groove is such that the second O ring forms a sliding fit within the nozzle body, to form a seal therewith.

23. A nozzle assembly comprising:
 a nozzle body comprising one end adapted for connection to a fluid supply source, a through bore for fluid, an annular sealing surface and a first locking means;

a nozzle insert comprising a nozzle body member, one end of which is adapted for engagement with the nozzle body and the other end of which includes a nozzle outlet, a through passage for fluid extending from the one end to the nozzle outlet, a generally frusto-conical annular sealing surface, which is located around the through passage and increases in diameter in a direction towards said other end thereof, and a second locking means complementary to the first locking means;

a first resilient annular sealing member mountable between the sealing surfaces of the nozzle body and the nozzle insert, and having, in a rest condition, an internal diameter no greater than the smallest diameter of the frusto-conical sealing surface; and wherein the first and second locking means can be engaged to maintain the nozzle insert and the nozzle body in an engaged position, in which the annular sealing member is displaced along the frusto-conical sealing surface and expanded radially, and is compressed between the sealing surfaces, whereby the sealing member both maintains a seal between the nozzle body and the nozzle insert and resiliently biases the first and second locking means into engagement with one another, wherein the first locking means comprises a pair of first locking projections extending radially inwards and defining first engagement faces and the second locking means comprises a pair of locking projections extending radially outwards and defining second engagement faces for abutting the first engagement faces, and wherein each of the first and second engagement faces is part annular and each second engagement face includes a short step at one end displaced axially to form an end face with another end face being provided at the other end thereof, the end faces serving to retain a corresponding first engagement face in position.

24. A nozzle assembly as claimed in claim 23, wherein the end faces are parallel with one another.

25. A nozzle assembly as claimed in claim 24, wherein the first locking projections are provided on a pair of locking legs which are diametrically opposed to one another and extend from the other end of the nozzle body.

26. A nozzle assembly as claimed in claim 25, wherein the internal of each leg is generally circular.

27. A nozzle assembly as claimed in claim 26, wherein the nozzle insert includes a first groove, including the frusto-conical sealing surface of the nozzle insert as a bottom surface thereof, wherein the nozzle insert includes a second annular groove located between the first annular groove and the first locking means, wherein a second annular sealing member is provided, with first and second annular sealing members being located in the first and second grooves respectively.

28. A nozzle assembly as claimed in claim 27, wherein each of the first and second annular sealing members comprises an O-ring having a rest diameter less than the diameter of the respective one of the first and second grooves.

29. A nozzle assembly comprising:
a nozzle body, comprising one end adapted for connection to a fluid supply source, a through bore for fluid, a first frusto-conical annular sealing surface which increases in diameter away from said one and towards the other end thereof and a first locking means;

a nozzle insert comprising a nozzle body member, one end of which is adapted for engagement with the nozzle body and the other end of which includes a nozzle outlet, a through passage for fluid extending from the one end to the nozzle outlet, a second frusto-conical annular sealing surface, which is located around the through passage and increases in diameter in a direction towards said other end thereof, and a second locking means complementary to the first locking means;

a first resilient annular sealing member mountable between the sealing surfaces of the nozzle body and the nozzle insert; and having, in a rest condition, an internal diameter no greater than the smallest diameter of the frusto-conical sealing surface; and wherein the first sealing surface has a generating angle substantially greater than the generating angle of the second sealing surface, whereby there is relatively little displacement of the first sealing member along the first sealing surface, wherein the first and second locking means can be engaged to maintain the nozzle insert and the nozzle body in an engaged position, in which the annular sealing member is displaced along the first frusto-conical sealing surface and expanded radially, and is compressed between the sealing surfaces, whereby the sealing member both maintains a seal between the nozzle body and the nozzle insert and resiliently biases the first and second locking means into engagement with one another.

30. A nozzle assembly as claimed in claim 29, wherein the first sealing surface has a generating angle of substantially 45°, and the second sealing surface has a generating angle of substantially 30°.

31. A nozzle assembly as claimed in claim 29, wherein the first sealing member comprises an O ring, and wherein the nozzle insert includes a first groove in which the O ring is mounted, with the second frusto-conical sealing surface of the nozzle insert being provided at the bottom of the first groove.

32. A nozzle assembly as claimed in claim 31, wherein the first locking means comprises a pair of locking projections extending radially inwards and defining part-annular first engagement faces, and wherein the second locking means comprise a pair of locking projections extending radially outwards from the nozzle insert and each providing a part-annular second engagement face for abutting a first engagement face.

33. A nozzle assembly as claimed in claim 32, wherein each of the second engagement faces includes a pair of end faces, for locating a respective first engagement face in an engaged position.

34. A nozzle assembly as claimed in claim 32 or 33, wherein the nozzle insert includes a second groove located between the first groove and nozzle outlet, a second O ring located in the second groove, for sealing the nozzle body, in engaged position, to prevent a fluid entry between the first and second O rings.

* * * * *